United States Patent [19]
Emori

[11] Patent Number: 5,859,072
[45] Date of Patent: Jan. 12, 1999

[54] PROCESS FOR TREATING EXPANDED POLYSTYRENE

[75] Inventor: Shoichi Emori, Chiba-ken, Japan

[73] Assignee: Seiken Chemical Co., Ltd., Chiba-ken, Japan

[21] Appl. No.: 765,884

[22] PCT Filed: May 15, 1996

[86] PCT No.: PCT/JP96/01273

§ 371 Date: Apr. 10, 1997

§ 102(e) Date: Apr. 10, 1997

[87] PCT Pub. No.: WO96/36662

PCT Pub. Date: Nov. 21, 1996

[30] Foreign Application Priority Data

May 15, 1995 [JP] Japan ............................ 7-140020

[51] Int. Cl.$^6$ ............................................. C08J 11/04
[52] U.S. Cl. ................................. 521/47; 521/40.5
[58] Field of Search ............. 264/DIG. 69; 210/523, 210/525; 521/40.5, 47

[56] References Cited

U.S. PATENT DOCUMENTS

| | | | |
|---|---|---|---|
| 819,664 | 5/1906 | Lowe | 210/523 |
| 4,126,551 | 11/1978 | Cognevich | 210/525 |
| 4,164,484 | 8/1979 | Tokuda et al. | 521/47 |
| 5,020,655 | 6/1991 | Cruver | 198/419.3 |
| 5,060,870 | 10/1991 | Trezek et al. | 241/19 |
| 5,169,588 | 12/1992 | Estepp | 264/331.17 |
| 5,300,267 | 4/1994 | Moore | 521/47 |
| 5,335,786 | 8/1994 | Roberto | 209/3 |

FOREIGN PATENT DOCUMENTS

| | | | |
|---|---|---|---|
| 50-36863 | 11/1975 | Japan | 264/DIG. 69 |
| 52-1752 | 1/1977 | Japan | 264/DIG. 69 |
| 56-17230 | 2/1981 | Japan | 264/DIG. 69 |
| 6-298992 | 10/1994 | Japan | 521/47 |
| WO94/24194 | 10/1994 | WIPO | 521/47 |
| WO95/00582 | 1/1995 | WIPO | 521/40.5 |

*Primary Examiner*—Allan R. Kuhns
*Attorney, Agent, or Firm*—Burns, Doane, Swecker & Mathis LLP

[57] ABSTRACT

A process for treating expanded polystyrene which comprises the step of softening a waste material of expanded polystyrene by immersing the material in a petroleum organic solvent mainly comprising liquid hydrocarbons in the neighborhood of the site yielding the waste material to form a dough-form intermediate product, the step of separating the intermediate product from the solvent by physical means, and the step of recovering and reclaiming the polystyrene contained in the intermediate product. The organic solvent is suitable a mixture mainly comprising aromatic hydrocarbons and aliphatic hydrocarbons and having the content of the aromatic hydrocarbons of 20 to less than 60 Wt %. According to this process, a low-tack intermediate product can be produced in a short time with an inexpensive organic solvent, and high quality polystyrene can be reclaimed from the intermediate product.

2 Claims, 4 Drawing Sheets

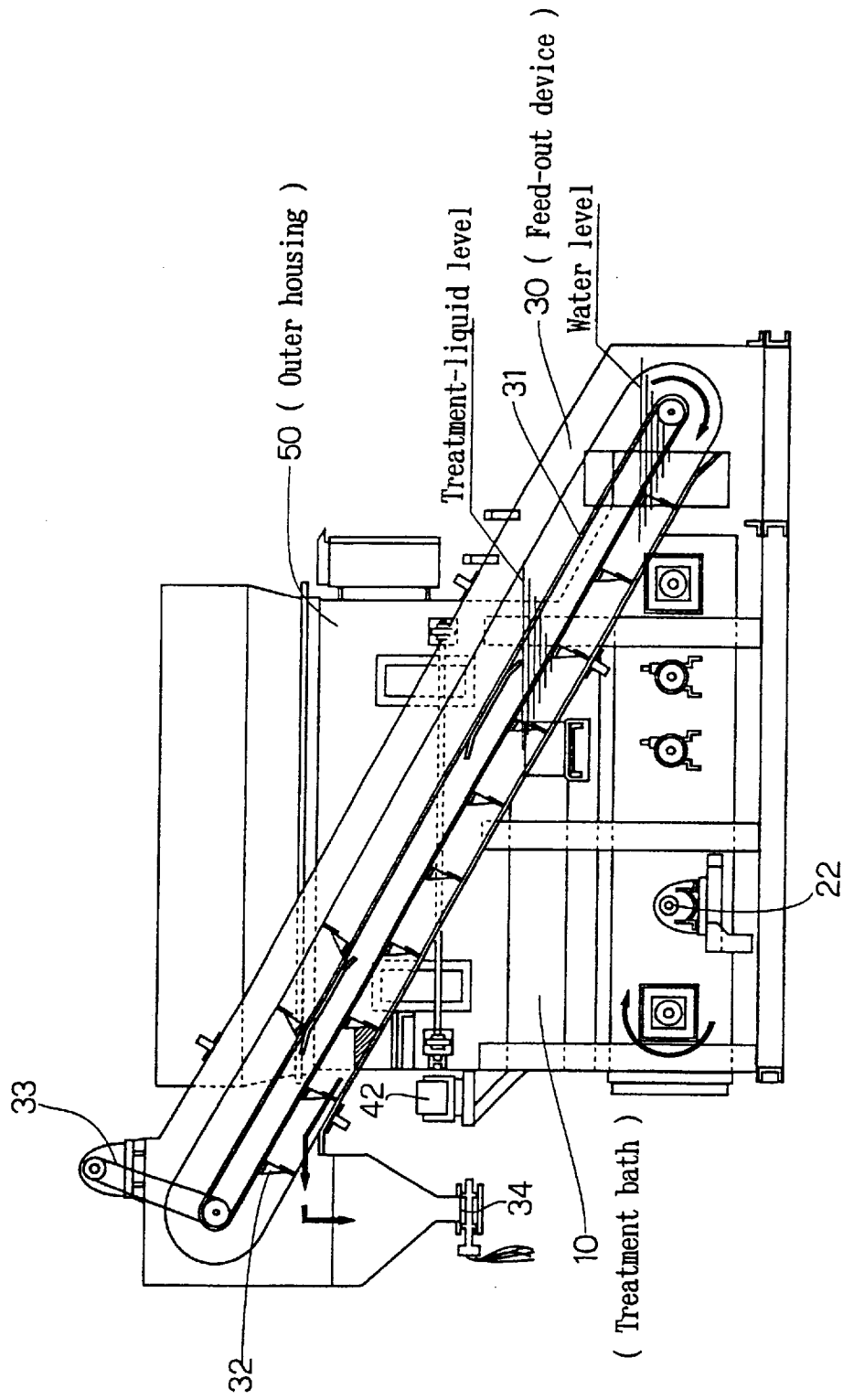

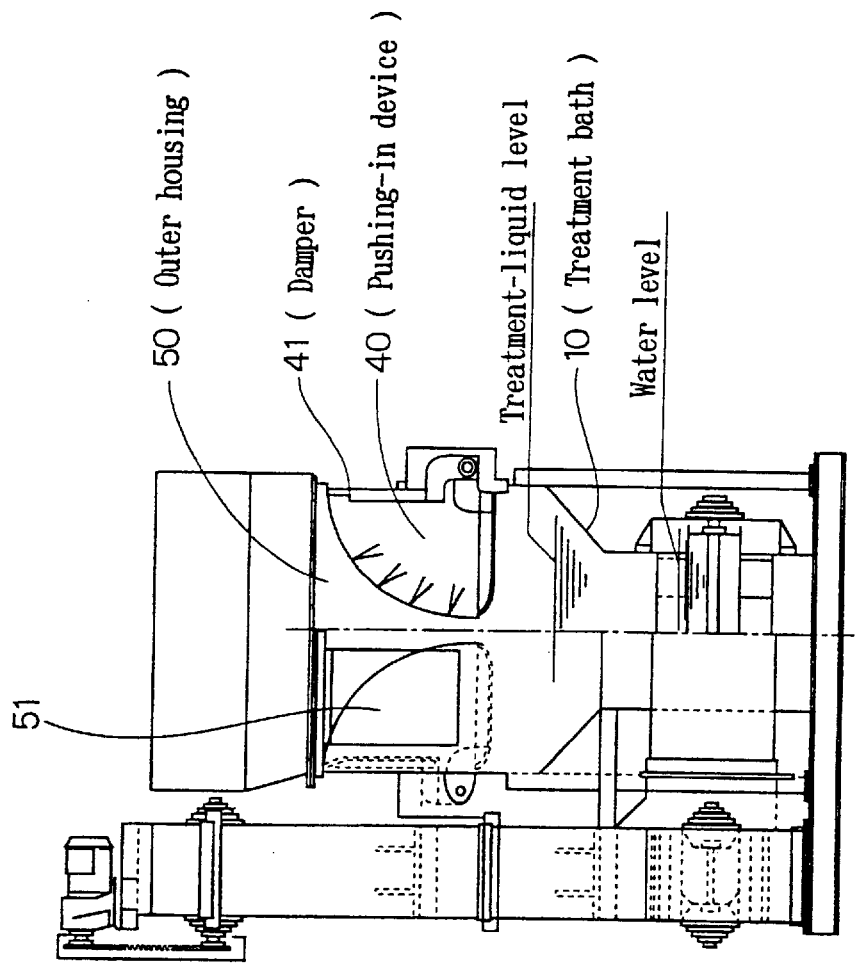

PROCESS FOR TREATING EXPANDED POLYSTYRENE

TECHNICAL FIELD

The present invention relates to a process for treating an expanded polystyrene to be used as container for various products, and an apparatus therefor.

BACKGROUND ART

A large amount of expanded polystyrene has been used in trading site as material for containers of wide variety of products, such as foods and so forth. In a fish market, fruit and vegetable market and so forth, a large amount of expanded polystyrene containers are disposed everyday. Upon thermal disposal of such disposed expanded polystyrene, problems are encountered not only in generation of black smoke with offensive odor resulting in pollution of the environmental air but also in generation of high temperature heat during thermal disposal possibly resulting in damaging of an incinerator. Therefore, upon disposal in the market or so forth, a thermal welting machine for melting the expanded polystyrene container by blowing hot air has been employed. However, even in this case, due to fag end, such as scales or bones of fish and so forth that adhere to the surface of a container made of expanded polystyrene, strong offensive odor tends to be generated.

Therefore, in the recent years, disposal treatment in a trading site, such as a fish market, fruit and vegetable market and so forth is avoided as much as possible and the disposed expanded polystyrene containers are transported to disposal equipment to perform disposal treatment such as thermal disposal or reduction into oil and so forth. On the other hand, in the recent years, trend to recycling of the expanded polystyrene is growing. Namely, an expanded polystyrene recycling association, in which manufacturers are involved, has been established and over hundred of disposal and recycling facilities, called as FC plaza, have been constructed in various places throughout the country. According to recent information, a law is going to be established to make collection and recycling activity involving the manufacturers as a major party, as a duty.

Expanded polystyrene has a large volume per unit weight for containing a large amount of air to encounter a problem of high transportation cost in transportation to the disposal and recycling facility. Namely, while the specific gravity of polystyrene resin (styrene) before foaming is a value slightly smaller than 1, the specific gravity of expanded polystyrene becomes about 0.02 for expansion of volume to be fifth times greater through foaming process which can be said as mixing with air. Therefore, a truck having a capacity for transporting 1 ton of waste material, may transport only 20 kg of expanded polystyrene. In other words, in order to transport 20 kg of polystyrene, fifty times of volume of air has to be transported simultaneously.

Therefore, there has been proposed a two stage treatment process, in which expanded polystyrene is dissolved in a limonene, as by-product in manufacturing of orange juice or so forth to generate an intermediate product with reduced volume at the trading site, such as a market or so forth, and the intermediate product is transported final treatment facility to perform final treatment. For detail of the recycling method utilizing limonene, see "Sanpai Times", Oct. 26, 1994 and so forth.

Since the foregoing two stage treatment method encounters the following problems for use of limonene as organic solvent.

At first, since limonene is natural produce extracted from peel of citrus fruit, such as orange or so forth, supply amount is limited and expensive.

Secondly, the intermediate produce of limonene and polystyrene increases viscosity according to increasing of polystyrene content, and in particular, when polystyrene content becomes greater than or equal to 40%, the intermediate produce becomes viscous like millet jelly to be difficult to handle.

Thirdly, since viscosity of the mixture is increased according to increasing of dissolving amount of polystyrene in limonene, subsequent dissolving speed of polystyrene is gradually lowered. Therefore, treatment period can be prolonged.

Fourthly, since limonene has low stability, reaction, such as polymerization or so forth can be caused in heating for separation and regeneration of polystyrene from the intermediate produce by distillation to generate irritating odor specific to limonene from the regenerated polystyrene and whereby to degrade quality of the regenerated polystyrene.

Accordingly, it is an object of the present invention to provide a method for treating expanded polystyrene which can use inexpensive organic solvent, generate the intermediate produce with low viscosity at short period and a high quality polystyrene can be regenerated from the intermediate product.

DISLOSURE OF THE INVENTION

In order to solve the problems in the prior art as set forth above, a process for treating according to the present invention comprises the steps of generating a dough-form intermediate product by immersing a waste of expanded polystyrene in an petroleum type organic solvent primarily consisted of a liquid state hydrocarbons for softening, in the vicinity of the site of yielding of the waste material, physically separating the intermediate product from the organic solvent to transport to a recycling processing facility, and, in the recycling processing facility as a destination of transportation, recovering and regenerating polystyrene contained in the intermediate product, from the intermediate product after separation. Also, preferably, the organic solvent is primarily consisted of a mixture of aromatic hydrocarbons and aliphatic hydrocarbons, and, in the mixture, a weight ratio of the aromatic hydrocarbons is set within a range of 20% to less than 60%.

By softening expanded polystyrene by immersing in petroleum type organic solvent primarily consisted of a liquid state hydrocarbons in the vicinity of the site of yielding, a high density dough-form intermediate product is generated. By producing the dough-form intermediate product instead of dissolving the polystyrene in the petroleum type organic solvent, the intermediate product can be easily and physically separated from the petroleum type organic solvent. The dough-form intermediate product separated from the petroleum type organic solvent is a mixture of polystyrene having specific gravity of substantially one and the organic solvent having specific gravity smaller than one and not contain air at all. Thus the specific gravity of the mixture becomes approximately 0.8. Therefore, in comparison with the expanded polystyrene having specific gravity of 0.02, the volume can be reduced to be about one thirty-fifth.

The liquid state hydrocarbons primarily consisted of a mixture of aromatic hydrocarbons and aliphatic hydrocarbons as one example of the preferred petroleum type organic solvent, is much less expensive than limonene. Also, by adjusting composition of the petroleum type organic solvent and temperature thereof, the intermediate product can be dough-form which is easy to physically separate from the organic solvent. The composition of the organic solvent after separation of the intermediate product, and thus the treatment speed, can be held constant. Furthermore, the liquid state hydrocarbons can be easily separated from polystyrene by distillation even in the stage of regeneration process to obtain high quality regenerated polystyrene.

BRIEF DESCRIPTION OF THE DRAWINGS

FIG. 3 is a side elevation showing the construction of the foregoing treatment apparatus; and FIG. 4 is a front elevation showing the construction of the foregoing treatment apparatus.

BEST MODE FOR IMPLEMENTING THE INVENTION

In one embodiment of the present invention, a liquid state hydrocarbons consisted of a mixture of aromatic hydrocarbons and aliphatic hydrocarbons, was used as an organic solvent. Among petroleum type organic solvent consisted of the mixture of aromatic hydrocarbons and aliphatic hydrocarbons, one having aromatic hydrocarbons content about 8 Wt % has been used and called as range oil (kerosine). On the other hand, the mixture having further lesser content of aromatic hydrocarbons has been used as stain remover in dry-cleaning. The petroleum type organic solvent to be used in the present invention has much higher range of aromatic hydrocarbons content to be higher than or equal to 10 Wt %, than those in the kerosine or stain remover. In the inventor's knowledge, it has not been known to use such petroleum type organic solvent as organic solvent for polystyrene.

It is desirable that the above-mentioned petroleum type organic solvent has a boiling point in a range of approximately 150° C. to 210° C. This is because that if the boiling point is lower than 150° C., it may easily catch fire to increase danger of fire, and conversely, if the boiling point is higher than or equal to 210° C., it becomes too close to 230° C. to 240° C. as treatment temperature upon formation of pellet of polystyrene or for forming to make separation from polystyrene by distillation. The petroleum type organic solvent was filled in a metallic container up to a middle level and expanded polystyrene was dipped into the organic solvent. The inventor has obtaining quite useful information that the softening start temperature of the polystyrene and composition of the intermediate product remarkably depend on composition ratio of aromatic hydrocarbons and aliphatic hydrocarbons.

Figure 1:
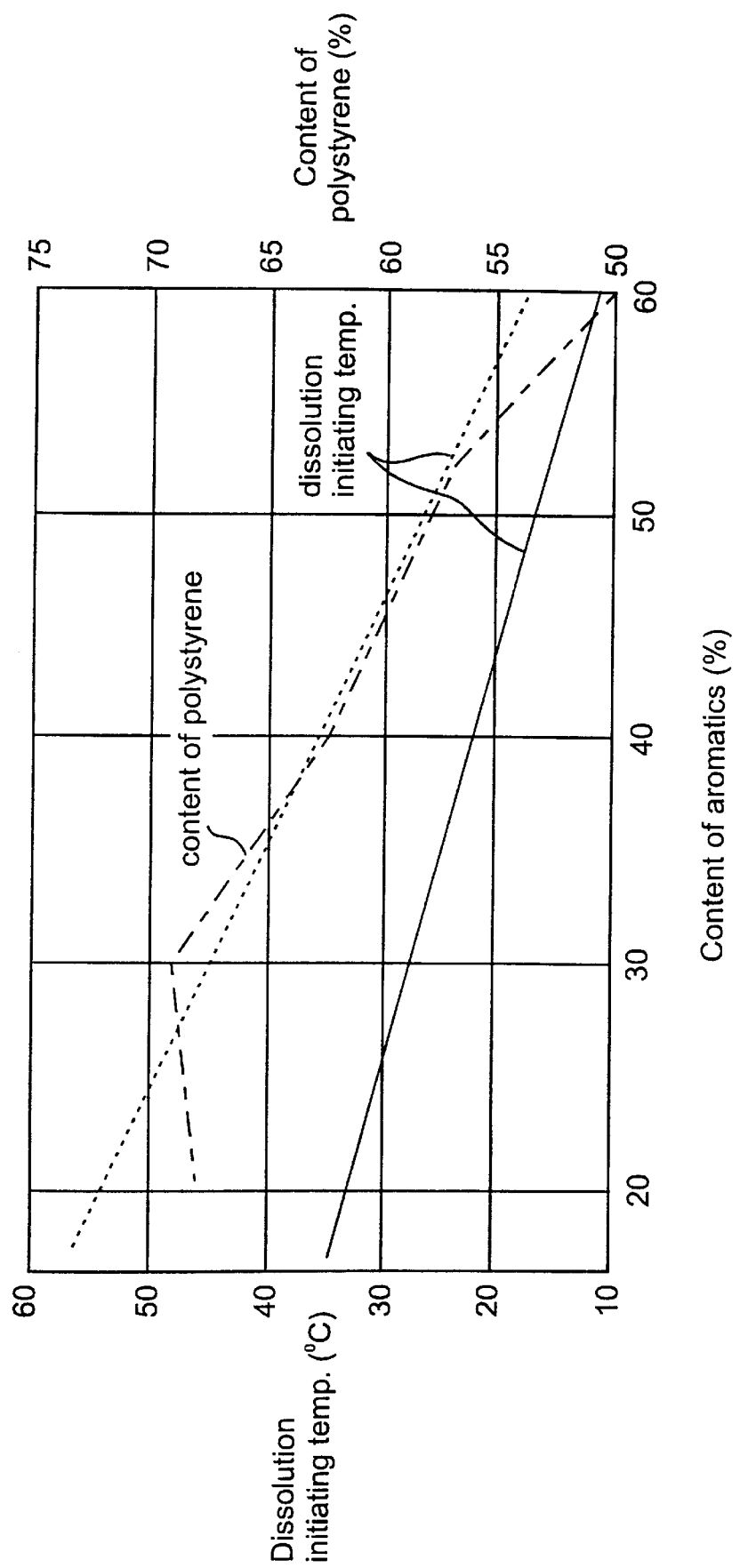
FIG. 1 is a graph showing experimental data relating to dissolving condition and composition of an intermediate product when kerosine is used as organic solvent in one embodiment of the present invention.

FIG. 1 is a graph showing results of experiments set forth above. A horizontal axis represents a content (Wt %) of aromatic hydrocarbons, one of vertical axes represents a liquid temperature (°C.) of the organic solvent, at which dough-forming associating with softening of expanded polystyrene or dissolving starts, and the other vertical axis represents a content (Wt %) of polystyrene in the intermediate product to be generated under 25° C. of liquid temperature of the organic solvent. The results of experiments have been obtained by filling 100 g in weight of the liquid state hydrocarbons in a large size beaker, and by immersing a plurality of small pieces of expanded polystyrene in 30 g to 50 g in total weight within the liquid state petroleum type organic solvent by hand for softening and dissolving. It should be noted that the boiling point of the organic solvent in the composition range shown in FIG. 1 was all within the range of 151° C. to 220° C.

In FIG. 1, a solid line represents a temperature, at which moderate dough-forming associating with softening or dissolving of expanded polystyrene starts, a broken line represents a temperature, at which acute dough-forming or dissolving of expanded polystyrene starts. Starting of moderate dough-forming or dissolving of expanded polystyrene can be checked by visually observing starting of generation of small amount of bubble. Starting of acute dough-forming or dissolving of expanded polystyrene can be checked by visually observing starting of generation of large amount of bubble. It has been found that decreasing of content of aromatic hydrocarbons results in higher dissolving start temperature of expanded polystyrene.

In FIG. 1, one-dotted line represents weight ratio (%) of polystyrene contained in the dough-form intermediate product generated at the liquid temperature at normal temperature (22° C. to 25° C.). The dough-form intermediate product is physically separated from the organic solvent, and thereafter, is further removed the organic solvent by manual squeezing. The dough-form intermediate product is consisted of a mixture of the polystyrene and liquid state hydrocarbons. According to decreasing of content of aromatic hydrocarbons in the liquid state hydrocarbons, the content of polystyrene contained in the dough-form intermediate product is increased. According to increasing of the content of the polystyrene in the intermediate product, stiffness of the intermediate product is increased. When the content of polystyrene exceeds about 62%, the stiffness of the intermediate product becomes substantial and in the extent to be said hard.

The stiffness of the dough-form intermediate product became more remarkable at lower liquid temperature of the organic solvent. On the other hand, when the content of the aromatic hydrocarbons in the organic solvent becomes greater than or equal to 60%, dough-form intermediate product resulting from softening is not generated and polystyrene is completely dissolved to make it impossible to physically separate the intermediate product from the organic solvent.

Increasing of content of polystyrene in the dough-form intermediate product naturally causes decreasing of content of the organic solvent in the intermediate product. Decreasing of the organic solvent achieves the following two advantages. The first advantage is that a weight of the intermediate product should be transported for transporting a given weight of polystyrene can be reduced to lower transportation cost. Second advantage is that amount of liquid state hydrocarbons to be inherently absorbed in the intermediate product upon taking the given amount of polystyrene into the dough-form intermediate product, can be reduced, namely consumption of the amount of organic solvent can be reduced. Reduction of consuming amount of the organic solvent may permit reduction of storage amount of the organic solvent in the trading site, such as market where generation of the intermediate product is to be performed and supply amount of the organic solvent thereto. Therefore, storage and transportation cost for the organic solvent can be lowered.

As set forth above, dissolving of expanded polystyrene significantly relies on action of the aromatic hydrocarbons.

Therefore, the inventor has expected that, concerning the liquid state hydrocarbons taken into the dough-form intermediate product, the content of the aromatic hydrocarbons may be greater than that in the solvent. However, in contrast to the inventor's expectation, it has been confirmed through the foregoing experiments that the composition of the liquid state hydrocarbons in the dough-form intermediate product is substantially matched with that in the original liquid state hydrocarbons. This means that the content of the organic solvent, accordingly dissolving condition of the expanded polystyrene shown in FIG. 1, and the physical and chemical property of the dough-formed intermediate product, is not significantly varied even elapsing of time.

Substantially constant physical and chemical property of the dough-formed intermediate product as set firth above, brings significant advantage in its generation process. Namely, if the content of the aromatic hydrocarbons in the organic solvent is gradually decreased associating with progress of generation of the dough-formed intermediate product as initially expected by the inventor, it should be required to operation for elevating temperature of the organic solvent according to elapsing of time, or supplying only aromatic hydrocarbons, for maintaining reaction speed constant. Such cumbersome operation becomes quite heavy burden for user. On the other hand, the fact that the physical and chemical property of the dough-form intermediate product is constant, becomes quite important advantage for physically separating the dough-form intermediate product from the organic solvent in the trading site, for transporting to the regeneration treatment facility, and further for regeneration process at the destination of transportation.

On the other hand, in contrast to expectation of the inventor, it has been confirmed that the surface of the dough-form intermediate product shows little adherence. This is quite advantageous for a mechanism to mechanically separate the dough-form intermediate product from the organic solvent, apparatus for loading and unloading the dough-form intermediate product separated from organic solvent into and from a truck for transportation. The reason is that, if the dough-form intermediate product has adherence as in the case of the limonene, operation for scraping off the intermediate product from the separation apparatus or loading and unloading apparatus becomes necessary, and should accelerate degradation of this kind of apparatus.

Further advantageously, it has been confirmed that even if the dough-form intermediate product is left in the atmosphere, the composition of the intermediate product, accordingly the weight ratio of the organic solvent is not varied abruptly. This means that evaporation speed of the organic solvent in the dough-form intermediate product through the surface thereof is appreciably slow. As a result, it can be said that there is lesser possibility to harm health of operator by evaporation of organic solvent from the intermediate product during transportation or is less danger to cause catching fire.

The inventor has obtained quite useful information through experiments for obtaining data shown in FIG. 1. Namely, the data shown in FIG. 1 is the experiment data obtained in merely immersing condition where the tip end of expanded polystyrene manually pushed into does not reach the bottom of the beaker. On the other hand, it has been confirmed that, in the condition where the tip end of expanded polystyrene manually pushed into does reach the bottom of the beaker, starting temperatures of generation of the dough-form intermediate product associated with softening and dissolving are shifted to lower temperature side. This phenomenon is considered that the softened expanded polystyrene by contacting with the organic solvent is mechanically broken by depression force exerted on expanded polystyrene, and that the contact area between the organic solvent and expanded polystyrene is progressively increased to promote generation of the dough-form intermediate product or dissolving.

Promotion of generation of the intermediate product or dissolving can be appreciated in consideration of the structure of expanded polystyrene. Namely, expanded polystyrene has a structure a huge number of voids surrounded by thin film of polystyrene are intimately coupled without interposing any significant gaps therebetween. Therefore, paying attention to certain mass of expanded polystyrene in certain size, unless the void of polystyrene at the outside is broken by softening (swelling) associating with contacting with the organic solvent or by dissolving, or the void of polystyrene is broken under assistance of external force, there is little chance that the organic solvent contact with the polystyrene defining inner side voids.

This is different from the case where the organic solvent penetrates into inside through mutually communicating conduits to start softening or dissolving in the inside simultaneously with the outside, such as that in a porous structure. In consideration of the structure specific to expanded polystyrene, by application of external force simultaneously with softening or dissolving, mechanical breakage of expanded polystyrene can be promoted. Associating therewith, a chance that the inner side expanded polystyrene may contact with the organic solvent can be increased. As a result, chemical variation, such as generation of the dough-form intermediate product due to softening or dissolving, can be promoted.

In the case where a treatment bath filled with the organic solvent is provided in the fish market, fruit and vegetable market or so forth for regularly generating the intermediate product in the method set forth above, it is preferred that the form of the intermediate product is the dough-form intermediate product which is easily to be physically separated from the organic solvent. On the other hand, it is possible to consider that the treatment bath filled with the organic solvent is temporarily provided at a position where a large amount of waste material of expanded polystyrene, such as food container or so forth, is generated temporarily, such as in an event venue, and after generation process of the intermediate product, the intermediate product is transported together with the waste liquid of the organic solvent to the regeneration facility.

In such case, it is possible that without physically separating the intermediate product and the organic solvent in the trading site and transporting into the regeneration treatment facility with maintaining the condition mixed in the treatment bath. In this case, it is also possible that the content of the aromatic hydrocarbons in the liquid state hydrocarbons may be set to be greater than or equal to about 60%, and the completely dissolved intermediate product is transported to the treatment facility together with waste liquid of the liquid state hydrocarbons.

As set forth above, the dough-form intermediate product physically separated from the liquid state hydrocarbons is transported to the recycle processing facility. In the recycle processing facility, distillation is performed with respect to the intermediate product to separate into the solid state polystyrene and petroleum type organic solvent. When the intermediate product is in completely dissolved state in the organic solvent, the intermediate product is transported to the recycle processing facility together with the waste liquid of the organic solvent containing the intermediate product therein and then separated into the solid state polystyrene and liquid state hydrocarbons by distillation.

Figure 2:
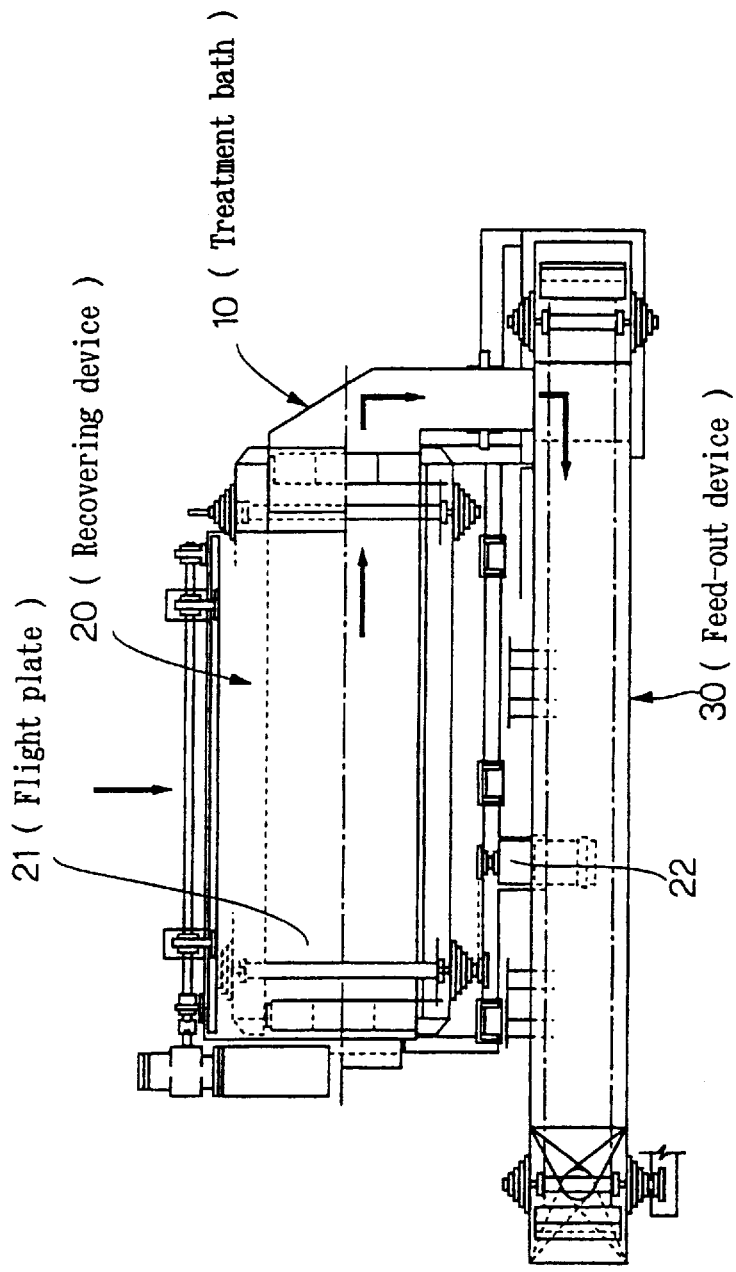
FIG. 2 is a plan view showing a construction of one embodiment of a treatment apparatus according to the invention.

Next, discussion will be given with respect to the embodiment of a treatment apparatus to be employed for implementing the above-mentioned expanded polystyrene treating process. The shown embodiment of the treatment apparatus employs the liquid state hydrocarbons as the organic solvent, and is constructed to physically separate the dough-form intermediate product from the organic solvent. FIGS. 2, 3 and 4 are plan view, side elevation and front elevation showing the construction of the shown embodiment of the treatment apparatus. 10 denotes a treatment bath, 20 denotes recovering device, 30 denotes a feed-out device, 40 denotes a pushing in device and 50 denotes an outer housing.

The outer housing 50 is arranged at the lower portion of the treatment bath 10. The treatment bath 10 is formed into rectangular configuration with a metal, such as a stainless or so forth, and a water layer is formed in the lower portion thereof. In the upper portion of the water layer, a layer of the liquid state hydrocarbons consisted of a mixture of aromatic hydrocarbons and aliphatic hydrocarbons having specific gravity smaller than 1 is formed. The pushing in device arranged at the upper portion of the outer housing 50 has a damper 41 and a motor 42 driving the former. The pushing in device 40 performs a function for automatically pushing in the waste expanded polystyrene charged within the outer housing 50 by opening a door 51 formed in the front portion at the upper portion of the outer housing 50, into the treatment bath 10 arranged at the lower portion.

The expanded polystyrene pushed into the treatment bath 10 by the pushing in device 40 is softened to be the dough-form intermediate product in the layer of kerosene at the upper portion. The dough-form intermediate product is consisted of a mixture of polystyrene having specific gravity slightly smaller than 1 and liquid state hydrocarbons having specific gravity smaller than that of the polystyrene. Therefore, the specific gravity of the dough-form intermediate product becomes a value smaller than that of the water and greater than that of the liquid state hydrocarbons. The dough-form intermediate product is thus aggregated in the vicinity of the boundary between the water layer and the liquid state hydrocarbons layer, namely in the vicinity of the water surface. Impurities, such as scale of fish, fish bone, waste vegetable, mud and so forth are normally have the specific gravity greater than 1 to be precipitated and maintained therein the bottom of the water layer and thus can be physically separated from the intermediate product.

A flight plate 21 arranged at the height position in the vicinity of the water surface and the recovering device 20 having the motor 22 for driving, are arranged within the treatment bath 10. The flight plate 21 of the recovering device 20 collects the dough-form intermediate product flowing in the vicinity of the water surface in the direction shown by arrow in the plan view of FIG. 2 (from left to right in the drawing). The dough-form intermediate product collected at the right end of the treatment bath 10 is moved in the direction shown by arrow in the plan view of FIG. 2 (from up to down in the drawing) to reach the lower end portion of the feed-out device 30.

The feed-out device includes a conveyer chain 31, a squeegee blade 32 and a motor 33 for driving the conveyer chain 31, and is arranged obliquely upward from the height in the vicinity of the water surface of the treatment bath 10. The dough-form intermediate product scraped above of the treatment bath 10 by the squeegee blade 32 is dropped out of the treatment apparatus through a lever type butterfly valve 34 and received with a feeding out container provided thereat. The dough-form intermediate product received in the feeding-out container is loaded on the rear body of the truck to be transported to the recycling processing facility.

While the foregoing has discussed in terms a construction where the liquid state hydrocarbons consisted of aromatic hydrocarbons and aliphatic hydrocarbons, it is possible to add other component therein, or other appropriate liquid state hydrocarbons having similar property to the disclosed liquid state hydrocarbons may be used as the organic solvent.

Furthermore, the treatment apparatus which is not provided a heating device in the treatment bath has been disclosed herein. However, a heating device comprising an electric heater and a temperature gauge, and a control unit for turning ON and OFF a power supply for the electric heater so that the detected temperature by the temperature gauge can be a predetermined set value, can be easily added to the treatment apparatus.

INDUSTRIAL APPLICABILITY

As set forth above, since the treatment process according to the present invention, is constructed to generate high density intermediate product, more preferably dough-form intermediate product which can be physically separated easily from the organic solvent, by dissolving waste of expanded polystyrene in the liquid state hydrocarbons based petroleum type organic solvent at a position in the vicinity of generation of the waste. Therefore, the intermediate product which has significantly reduced in volume, can be transporting efficiently to recycle processing facility at low cost, and recycling process can be performed.

Particularly, by employing the liquid state hydrocarbons containing aromatic hydrocarbons and aliphatic hydrocarbons as major component, as the organic solvent, the intermediate product can be formed in dough-form but have low adherence, and the organic solvent within the intermediate product is difficult to evaporate.

Furthermore, by employing the liquid state hydrocarbons containing aromatic hydrocarbons and aliphatic hydrocarbons as major component, an optimal value of weight ratio of the aromatic hydrocarbons and the aliphatic hydrocarbons can be selected to establish the most economical treatment system adapted to mode of operation of the system, and operate the same.

I claim:

1. A process for treating expanded polystyrene comprising the steps of:

generating a dough-form intermediate product by immersing expanded polystyrene in a petroleum type organic solvent consisting essentially of hydrocarbons in a liquid state for softening, said organic solvent consists essentially of a mixture of aromatic hydrocarbons and aliphatic hydrocarbons. and, in said mixture, a weight ratio of said aromatic hydrocarbons is set within a range of 20% to less than 60%;

physically separating the intermediate product from said organic solvent; and recovering and regenerating polystyrene contained in said intermediate product, from said intermediate product after separation.

2. A process for treating expanded polystyrene comprising the steps of:

generating a dough-form intermediate product by immersing expanded polystyrene waste in a petroleum type organic solvent consisting essentially of hydrocarbons in a liquid state for softening, in the vicinity of a site where the waste is generated;

said organic solvent consists essentially of a mixture of aromatic hydrocarbons and aliphatic hydrocarbons, and, in said mixture, a weight ratio of said aromatic hydrocarbons is set within a range of 20% to less than 60% physically separating the intermediate product from said organic solvent and transporting the separated intermediate product to a recycle processing facility; and in the recycle processing facility as a destination of transportation, regenerating polystyrene from said intermediate product.

* * * * *